US008503794B2

(12) United States Patent
Omer et al.

(10) Patent No.: US 8,503,794 B2
(45) Date of Patent: Aug. 6, 2013

(54) DATA DIFFERENCE GUIDED IMAGE CAPTURING

(75) Inventors: Ido Omer, Medina, WA (US); Eyal Ofek, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 466 days.

(21) Appl. No.: 12/845,143

(22) Filed: Jul. 28, 2010

(65) Prior Publication Data

US 2012/0027250 A1 Feb. 2, 2012

(51) Int. Cl.
*G06K 9/62* (2006.01)
(52) U.S. Cl.
USPC ............ 382/209; 382/154; 701/468; 701/450
(58) Field of Classification Search
USPC .......................... 382/103, 154; 701/468, 450
See application file for complete search history.

(56) References Cited

U.S. PATENT DOCUMENTS

| | | | |
|---|---|---|---|
| 5,839,088 A * | 11/1998 | Hancock et al. ............. | 701/468 |
| 6,243,483 B1 | 6/2001 | Petrou et al. | |
| 6,343,301 B1 | 1/2002 | Halt et al. | |
| 6,385,539 B1 | 5/2002 | Wilson et al. | |
| 6,745,126 B1 * | 6/2004 | Pavlak et al. .................. | 701/50 |
| 7,295,922 B2 * | 11/2007 | Simon Robert et al. ...... | 701/409 |
| 7,663,671 B2 * | 2/2010 | Gallagher et al. .......... | 348/231.2 |
| 2002/0003495 A1 * | 1/2002 | Johnstone et al. ........ | 342/357.13 |
| 2003/0060215 A1 * | 3/2003 | Graham ........................ | 455/456 |
| 2007/0175998 A1 * | 8/2007 | Lev ................................ | 235/454 |
| 2007/0248260 A1 | 10/2007 | Pockett | |
| 2009/0100031 A1 | 4/2009 | Gilligan et al. | |
| 2009/0138497 A1 | 5/2009 | Zavoli et al. | |
| 2009/0278938 A1 | 11/2009 | Shulman | |
| 2010/0098342 A1 * | 4/2010 | Davis et al. ................... | 382/220 |
| 2010/0100540 A1 * | 4/2010 | Davis et al. ................... | 707/728 |
| 2010/0100548 A1 * | 4/2010 | Scott et al. .................... | 707/741 |
| 2010/0100835 A1 | 4/2010 | Klaric et al. | |

FOREIGN PATENT DOCUMENTS

WO WO 2010/077229 A1 7/2010

OTHER PUBLICATIONS

First Office Action dated Nov. 16, 2012, received in co-pending Chinese Application No. 201110213255.2.
Barber, et al., "Change detection for topographic mapping using three-dimensional data structures", Retrieved at <<http://www.isprs.org/proceedings/XXXVII/congress/4_pdf/206.pdf >>, International Archives of Photogrammetry, Remote Sensing and Spatial Information Sciences, 2008, pp. 1177-1182.
Teller, Seth., "Scalable, Controlled Imagery Capture in Urban Environments", Retrieved at <<http://citeseerx.ist.psu.edu/viewdoc/download?doi=10.1.1.71.2095&rep=rep1&type=pdf >>, MIT LCS Technical Report 825, Sep. 2001, pp. 1-9.
Hurlbut, Karen., "Arcview image analysis", Retrieved at <<http://www.esri.com/news/arcuser/0499/imagedata.html >>, Retrieved Date: Apr. 27, 2010, pp. 4.

* cited by examiner

*Primary Examiner* — Vu Le
*Assistant Examiner* — Aklilu Woldemariam
(74) *Attorney, Agent, or Firm* — The Law Office of Michael E. Kondoudis

(57) ABSTRACT

Methods and apparatuses are disclosed. Previously stored images of one or more geographic areas may be viewed by online users. A new low-resolution image may be acquired and aspects of the new low-resolution image may be compared with a corresponding one of the previously stored images to determine an amount of change. A determination may be made regarding whether to acquire a new high-resolution image based on the determined amount of change and a freshness score associated with the one of the previously stored images. In another embodiment, a new image may be captured and corresponding location data may be obtained. A corresponding previously stored image may be obtained and compared with the new image to determine an amount of change. The new image may be uploaded to a remote computing device based on the determined amount of change and a freshness score of the previously stored image.

20 Claims, 5 Drawing Sheets

DATA DIFFERENCE GUIDED IMAGE CAPTURING

BACKGROUND

Online mapping services, such as, for example, Bing® Maps (Bing is a registered trademark of Microsoft Corporation of Redmond, Wash.) or Google® Maps (Google is a registered trademark of Google Inc. of Mountain View, Calif.), strive to have an extensive representation of Earth having maximum coverage, freshness and depth. However, maintaining maximum coverage is expensive. For example, acquisition of new high quality image data for a geographic image database is usually quite costly. For example, when acquiring high-resolution aerial images, one must incur a cost for a plane to travel over a geographic area to capture high-resolution image data. Typically, the cost for acquiring the high-resolution aerial image data is quite expensive. As a result, high-resolution aerial image data may not be acquired frequently and online high quality image data may be several years old.

When acquiring street-level images, vehicles equipped with image capturing devices, such as, for example, cameras or other devices, as well as location sensors, may travel along streets to scan and collect the street-level images and corresponding location data. Each of the vehicles may have a storage device for storing the captured street-level images and the corresponding location data and may periodically upload all of the captured street-level image data to one or more remote computing devices for processing. In some cases, the captured street-level image data may be uploaded only at an end of each day, thereby requiring each of the vehicles to have a storage device capable of storing up to one day's amount of collected street-level images and location data. When a storage device in a vehicle has reached its capacity, no additional street-level images and location data may be captured. The one or more computing devices may process all of the uploaded captured street-level image data, from each of the vehicles, in order to update coverage of one or more geographic area.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In an embodiment consistent with the subject matter of this disclosure, low-resolution aerial images of one or more geographic areas may be acquired. A computing device may compare each of the low-resolution aerial images with a respective corresponding previously stored high-resolution aerial image to determine an amount of change. The computing device may determine whether a new high-resolution aerial image is to be obtained to replace the respective corresponding previously stored high-resolution aerial image based on the determined amount of change and a freshness score of the respective corresponding previously stored high-resolution aerial image. In one implementation, when the computing device determines that a new high-resolution aerial image is to be obtained, the computing device may hallucinate a synthetic high-resolution aerial image, based on a respective recent low-resolution aerial image, to replace the respective corresponding previously stored high-resolution aerial image until the new high-resolution aerial image is provided.

In another embodiment and image capturing device, location sensors, and a computing device may be placed in a vehicle. The vehicle may travel within one or more geographic areas while street-level images and corresponding location data are captured. The computing device may receive the captured street-level images and the corresponding location data. For each of the captured street-level images, the computing device may request and receive a corresponding previously stored image (or information that may be more compressed, but enables detection of changes) and an associated freshness score from a remote computing device. The computing device may compare aspects of the respective captured street-level image with the corresponding previously stored image to determine an amount of change. Based on the determined amount of change and the freshness score, the computing device may make a determination either to upload the respective captured street-level image to the remote computing device, or to discard the respective captured street-level image. In variations of this embodiment, different techniques may be employed to limit effects of certain objects that may appear in the respective captured street-level image from affecting the determined amount of change.

DRAWINGS

In order to describe the manner in which the above-recited and other advantages and features can be obtained, a more particular description is discussed below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Figure 1:
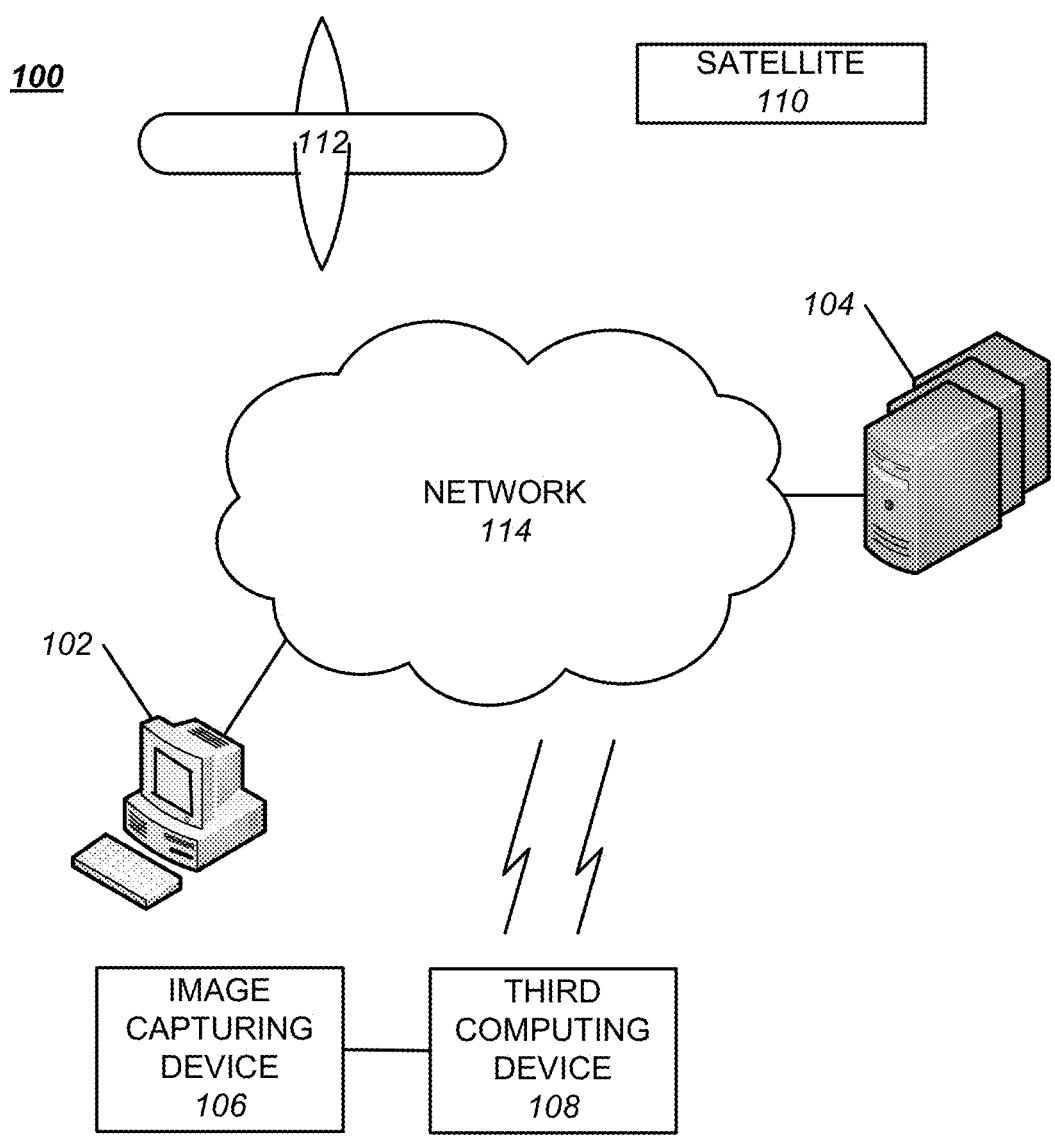
FIG. 1 illustrates an exemplary operating environment for various embodiments consistent with the subject matter of disclosure.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Overview

In various embodiments, methods and apparatuses for guided data capturing are disclosed. In one embodiment, low-resolution aerial image data, including but not limited to low-resolution satellite image data, may be acquired. A cost for acquiring low-resolution aerial image data, such as low-resolution satellite image data or other low-resolution aerial image data, is significantly less expensive than a cost for acquiring high-resolution aerial image data. For example, road vector data, as published by suppliers such as, for example, NAVTECH® (NAVTECH is a registered trademark of Navigation Technologies Corporation of Rosemont, Ill.) or Teleatlas, may be updated monthly. Satellite imagery, such as imagery provided by Landsat or Spot Image are commercially available at low cost and are frequently updated. For example, every point on Earth is updated more than once each month.

Previously-obtained high-resolution aerial image data of a number of geographic areas may be stored for online use. Each item of the previously-obtained high-resolution aerial image data may have a respective freshness score, which may be a function of time. The freshness score may be indicative of a probability that a new high-resolution image, or image data, is to be acquired in order to update coverage of a corresponding geographic area. For example, at a maximum age, Kmax, the freshness score of items of the previously-obtained high-resolution aerial image data may have a value, such as, for example, 1, indicating a 100% probability that a plane will be sent to acquire new high-resolution aerial image data to update the coverage of a corresponding geographic area. In one embodiment, Kmax may be five years. However, for various geographical areas, Kmax may have other suitable values, such as, for example, 30 months, 30 days, or another value.

One or more computing devices may compare aspects of a recently acquired low-resolution aerial image with aspects of a corresponding previously-obtained high-resolution aerial image. The one or more computing devices may determine whether to order a new high-resolution aerial image to replace the corresponding previously-obtained high-resolution aerial image based on a determined amount of change and a freshness score associated with the corresponding previously-obtained high-resolution aerial images.

Many vehicles currently drive through streets of a geographic area on a daily basis. The vehicles may include, but are not limited to, vehicles for transportation companies, mail delivery vehicles, taxis, waste management vehicles, as well as other vehicles. Each of the vehicles may be equipped with one or more image capturing devices, one or more location sensors, and a computing device with a storage device for storing captured image data. The one or more image capturing devices and the one or more location sensors may provide recently captured street-level image data and corresponding location data to the computing device. The computing device may request one or more remote computing devices to provide previously acquired and stored image data corresponding to the location data provided by the one or more location sensors. The computing device may receive, from the one or more remote computing devices, the requested previously acquired and stored image data and a corresponding freshness score, which the computing device may display.

The computing device may then compare various aspects of the recently captured street-level image data with the requested previously acquired and stored image data to determine an amount of change. The amount of change may be focused on man-made changes including, but not limited to, a change in appearance of roads and buildings, or agricultural changes within a geographic area, as well as other types of changes. For example, aspects of the requested previously acquired and stored image data and the recently captured street-level image data, such as, for example, spectral reflectance, textures, color distribution as well as other aspects, may be compared.

An amount of change of the various aspects and the freshness score of the previously acquired and stored image data may be used to determine whether the recently captured street-level image data may be uploaded to the one or more remote computing devices in order to update coverage of the geographic area, or whether the recently captured street-level image data may be discarded. In some embodiments, when the previously acquired and stored image data has a high freshness score, indicating that the previously acquired and stored image data is relatively old, a first minimum amount of change may result in a determination to upload the recently captured street-level image data to the one or more remote computing devices for processing. When the previously acquired and stored image data has a low freshness score, indicating that the previously acquired and stored image data is relatively young, the determination to upload the recently captured street-level image data to the one or more remote computing devices for processing may have a minimum amount of change for the determination, which is larger than the minimum amount of change with respect to the relatively old previously acquired and stored image data. That is, when the previously acquired and stored image data is relatively young, a first minimum amount of change for a determination to be made to upload the recently captured street-level image data to the one or more remote computing devices is larger than a second minimum amount of change, with respect to the relatively old previously acquired and stored image data.

Exemplary Operating Environment

FIG. 1 is a functional block diagram of an exemplary operating environment 100 for various embodiments. Exemplary operating environment 100 may include a first computing device 102, one or more second computing devices 104, an image capturing device 106, a third computing device 108, a satellite 110, a plane 112, and a network 114.

First computing device 102 may be a computing device of a user who wishes to view image data of one or more geographic locations. First computing device 102 may be a desktop personal computer, a notebook personal computer, a personal digital assistant (PDA), or other type of computing device. One or more second computing devices 104 may include one server or multiple servers connected to one another in a server farm, one or more computing devices from a group of computing devices including a desktop personal computer, a notebook personal computer, a PDA, and other computing devices.

Image capturing device 106 may be a digital camera or other type of digital image capturing device. Third computing device 108 may include one or more computing devices selected from a group including notebook personal computers, one or more desktop personal computers, and one or more other types of computing devices. Third computing device 108 may have a wired or wireless connection with image capturing device 106. In some embodiments, image capturing device 106 and one or more third computing devices 108 may be placed within a vehicle, such as, for example, a car, a truck, a bus, or other type of vehicle.

Network 114 may include a local area network, a wide area network, a packet switching network, an ATM network, a frame relay network, a fiber optic network, a public switched telephone network, a wireless network, a wired network, another type of network, or any combination thereof. First computing device 102 and second computing device 104 may be connected to network 114. Third computing device 108 may be connected to second computing device 104 either through a wireless connection to network 114 or through a connection via another network or group of networks.

Satellite 110 may include one or more image capturing devices for acquiring low-resolution aerial images, or image data, with respect to a number of geographic areas. Plane 112 or satellite 110 may include one or more image capturing devices for acquiring high-resolution aerial images, or image data with respect to the number of geographic areas. Acquired low resolution aerial images, or image data, captured by satellite 110 may be provided to second computing device 104. Similarly, one or more high-resolution aerial images, or image data, from plane 112 or satellite 110 may be provided to second computing device 104.

Exemplary Computing Device

Figure 2:
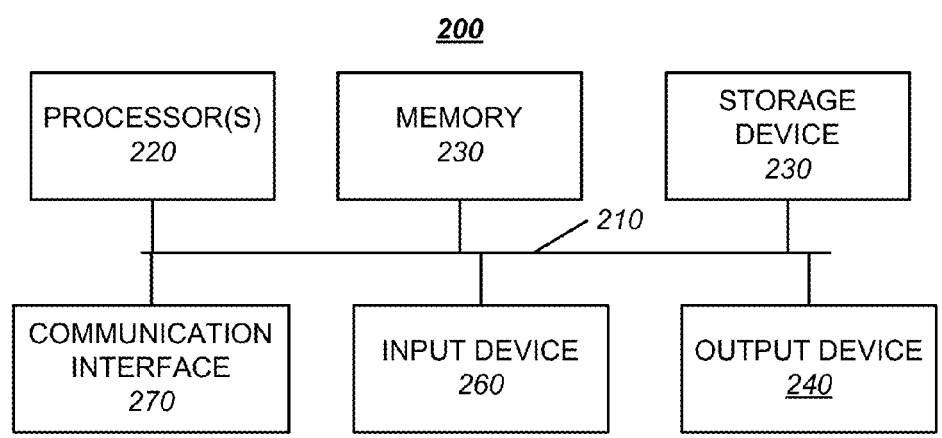
FIG. 2 is a functional block diagram of an exemplary computing device, which may be used to implement embodiments consistent with the subject matter of this disclosure.

FIG. 2 is a block diagram of an exemplary computing device 200, which may be employed to implement one or more embodiments consistent with the subject matter of this disclosure. Exemplary computing device 200 may include a bus 210, a processor 220, a memory 230, an output device 240, a storage device 250, an input device 260, and a communication interface 270. Bus 210 may connect processor 220, memory 230, output device 240, storage device 250, input device 260 and communication interface 270.

Processor 220 may include one or more conventional processors that interpret and execute instructions. Memory 230 may include a Random Access Memory (RAM), a Read Only Memory (ROM), and/or other type of dynamic or static storage device that stores information and instructions for execution by processor 120. The RAM, or the other type of dynamic storage device, may store instructions as well as temporary variables or other intermediate information used during execution of instructions by processor 120. The ROM, or the other type of static storage device, may store static information and instructions for processor 120.

Output device 240 may include a display device such as, for example, a plasma display, a liquid crystal display, a cathode ray tube (CRT), other type of display device, or other type of output device.

Storage device 250 may include a storage medium including, but not limited to, optical disc, flash RAM, magnetic tape, magnetic disk, or other type of storage device. Storage device 250 may have stored thereon an operating system, hardware configuration information, and/or one or more executable applications.

Input device 260 may include a keyboard, a pointing device, or other type of input device. The pointing device may be, for example, a computer mouse, a trackball, a user's finger or other type of pointing device.

Communication interface 170 may include one or more transceivers for transmitting and receiving data via a wireless or a wired connection.

A number of exemplary computing devices 200 may be used to implement first computing device 102, second computing device 104, and/or third computing device 108. When exemplary computing device 200 implements first computing device 102, communication interface 270 may have a wired or wireless connection to network 114. When exemplary computing device 200 implements second computing device 104, communication interface 270 may have a wired or wireless connection to network 114, and when third computing device 108 is not connected to second computing device 104 via network 114, second computing device 104 may further include a second communication interface to a second network connected to third computing device 108. When exemplary computing device 200 implements third computing device 108, communication interface 270 may include a first communication interface to interface with image capturing device 106 and a second communication interface to interface with the second computing device 104 via either network 114 or another network.

Exemplary Processing

Figure 3:
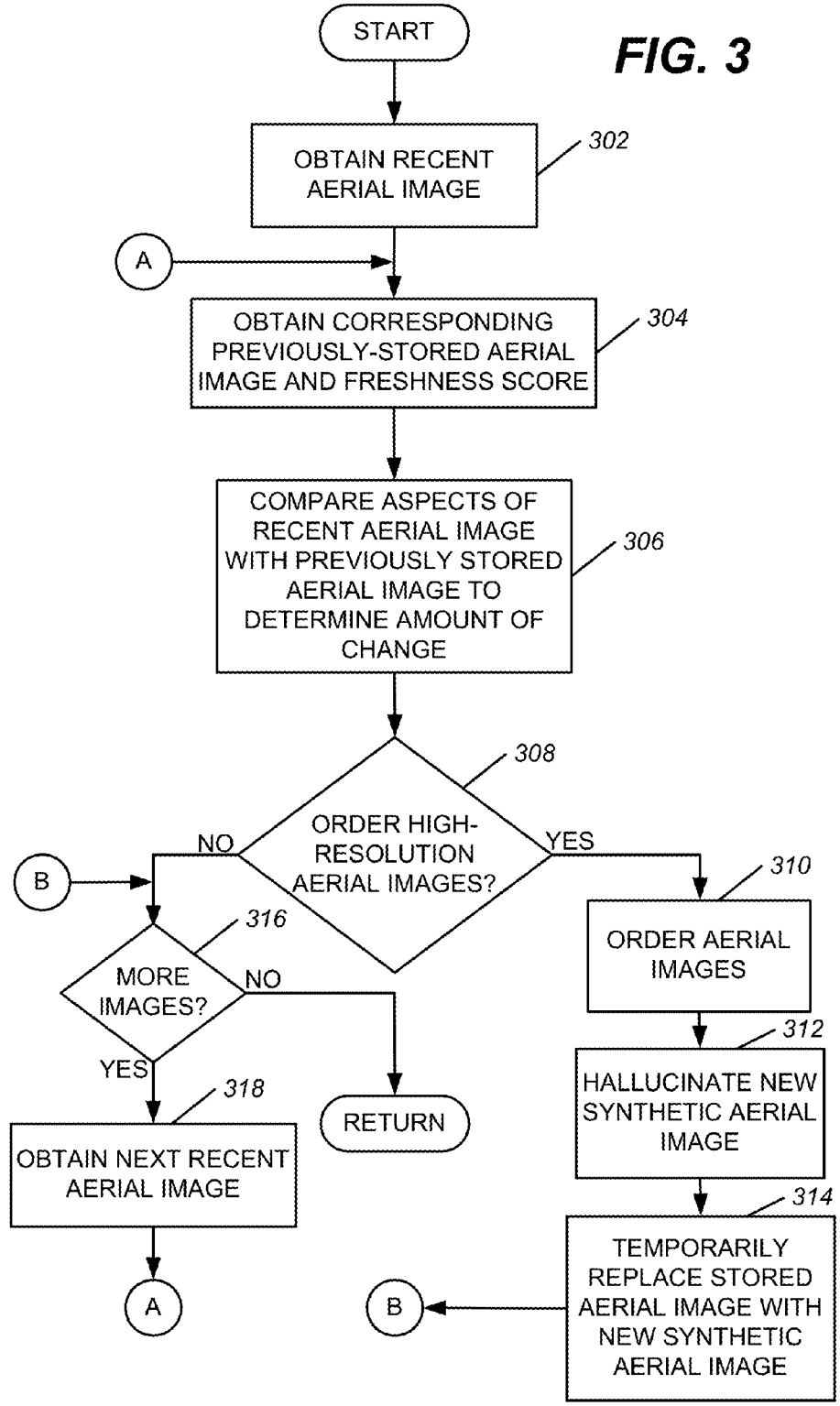
FIG. 3 illustrates a flowchart of an exemplary process in one embodiment.

FIG. 3 is a flowchart illustrating exemplary processing in an embodiment consistent with the subject matter of this disclosure. The process may begin with second computing device 104 obtaining a recently captured low-resolution aerial image, or image data, from satellite 110 and corresponding location information with respect to a geographic area (act 302). Second computing device 104 may then obtain a corresponding previously acquired and stored high-resolution aerial image, or image data, along with an associated freshness score (act 304).

Second computing device may then compare various aspects of the recently captured low-resolution aerial image, or image data, with the previously acquired and stored high-resolution aerial image to determine an amount of change (act 306). In order to reduce differences caused by seasonal changes, in one implementation, the previously acquired and stored high-resolution aerial image and the recently acquired low-resolution aerial image both may have been acquired during a same season of different years or during a same month of different years. In some implementations, the previously acquired and stored high-resolution aerial image and the recently acquired low-resolution aerial image both may have been acquired by a same satellite. The amount of change may be focused on agricultural changes by determining an amount of change with respect to color distribution. Further, the amount of change may be focused on man-made changes including, but not limited to, changes in appearance of roads and buildings, which may be determined based on image appearance, spectral reflectance, textures, as well as other aspects of the images.

Next, second computing device 104 may determine whether to order a high-resolution aerial image based on the determined amount of change and the freshness score of the previously acquired and stored image, or image data (act 308). As previously mentioned, with respect to an older previously acquired and stored image, or image data, a minimum amount of change for a determination to order high-resolution aerial images is smaller than a minimum amount of change, with respect to a newer previously acquired and stored image, or image data, for the determination to order high-resolution aerial images.

If, during act 308, second computing device 104 determines that a high-resolution aerial image is to be ordered, then second computing device 104 may provide an indication that the high-resolution aerial image is to be ordered, or second computing device 104 may automatically place an order for the high-resolution aerial image (act 310). Second computing device 104 may then hallucinate a new synthetic aerial image based on the recently acquired low-resolution aerial image (act 312). In some implementations, the synthetic aerial image, when rendered, may have a cartoon-like appearance. The second computing device 104 may then temporarily replace the previously acquired and stored aerial image with the new synthetic aerial image until a new high-resolution aerial image is provided (act 314). Thus, if a user makes a request to view an aerial image with respect to a geographic area of a corresponding previously acquired and stored aerial image, or image data, that has been replaced by a hallucinated synthetic aerial image, the user may be presented with the synthetic aerial image. The user may also be presented with a corresponding freshness score of the replaced previously acquired and stored aerial image, or image data.

If, during act 308, second computing device 104 determines that high-resolution aerial images are not to be ordered, or after second computing device 104 performs act 314, second computing device 104 may determine whether any additional recently captured low-resolution aerial images exist (act 316). If no additional recently captured low-resolution aerial images exist, then the process may be completed. Otherwise, second computing device 104 may obtain a next recently captured low-resolution aerial image (act 318) and may again perform acts 304-318.

In some embodiments, a determination to order high-resolution aerial images may be based on non-image data including, but not limited to, data from maps, data indicating a significant increase or decrease in cell phone usage in at least a portion of a geographic area, articles concerning new construction, demolition, or land use changes, as well as other non-image data.

Figure 4:
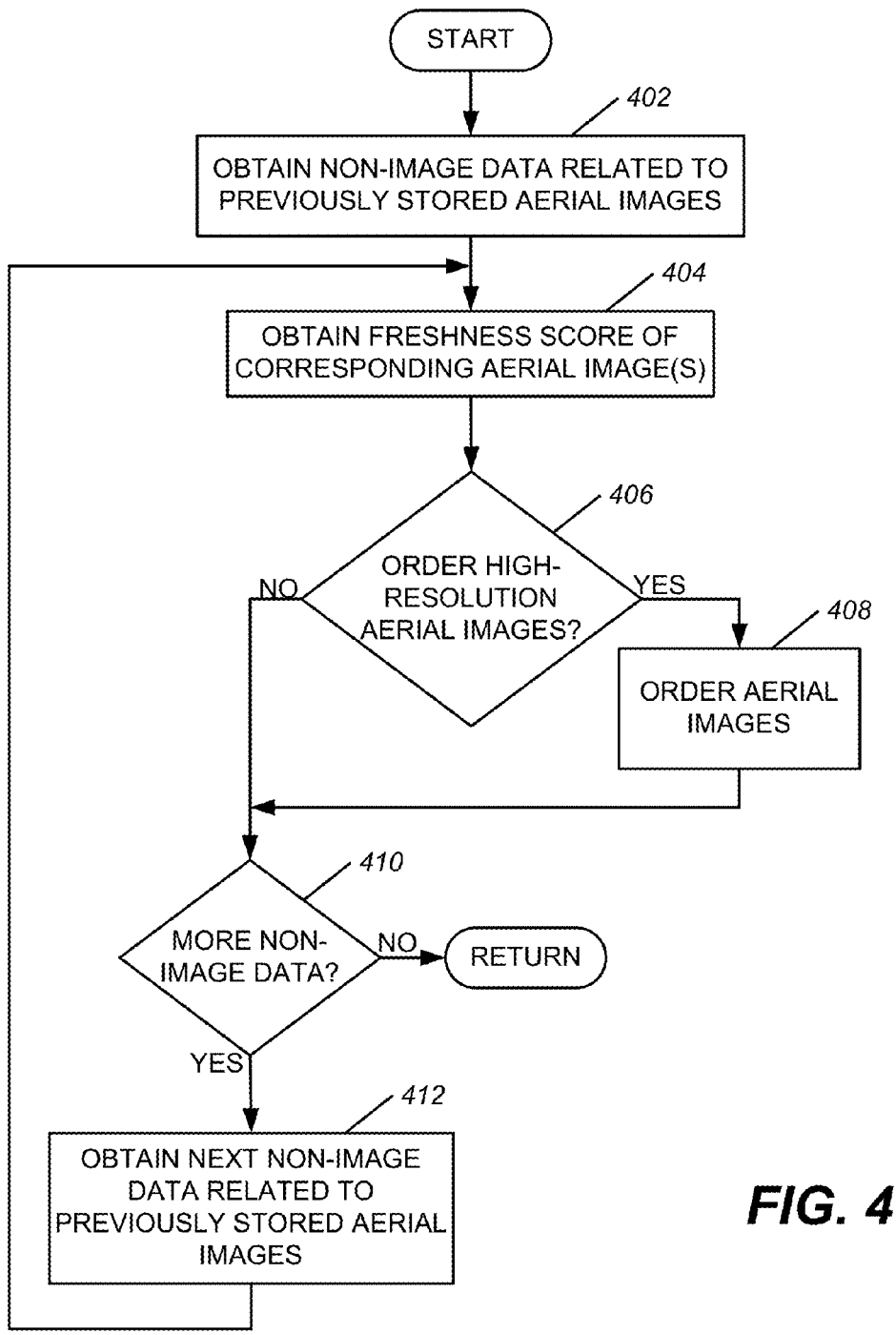
FIG. 4 illustrates a flowchart of an exemplary process in a variation of the embodiment of FIG. 3.

FIG. 4 is a flowchart illustrating exemplary processing in an implementation in which a determination to order high-resolution aerial images is further based on non-image data. The process may begin with second processing device 104 obtaining, or being provided with, non-image data related to previously acquired and stored aerial images (act 402). Second computing device 104 may then obtain a freshness score of a corresponding previously acquired and stored aerial image (act 404).

Second computing device 104 may then make a determination whether to order high-resolution aerial images based on the freshness score and the non-image data (act 406). As an example, non-image data may have an associated value. A change with respect to a major road may have a higher value than a change with respect to a side street. A change with respect to a group of buildings on a same street may have a higher value than a change with respect to a single building on a same street, and so on. Thus, the associated value of non-image data may be a sum of values associated with various types of changes. A minimum value with respect to making a determination to order an aerial image may be lower when a freshness score for a corresponding previously acquired and stored aerial image indicates an older image age as compared to a minimum value with respect to making the determination to order aerial images when the freshness score for the corresponding previously acquired and stored aerial image indicates a younger image age.

If, during act 406, second computing device determines that the high-resolution aerial image is to be ordered, then second computing device 104 may indicate that the high-resolution aerial image is to be ordered, or may place an order for the high-resolution aerial image of the geographic area (act 408).

After performing act 408, or after performing act 406 and determining that a new hi-resolution aerial image is not to be ordered, second computing device 104 may determine whether additional non-image data exists to be processed (act 410). If additional non-image data does not exist, then the process is completed. Otherwise, second computing device 104 may obtain a next item of non-image data related to a previously stored aerial image, or image data (act 412). Second computing device 104 again may perform acts 404-412 until no additional non-image data exists to be processed.

Figure 5:
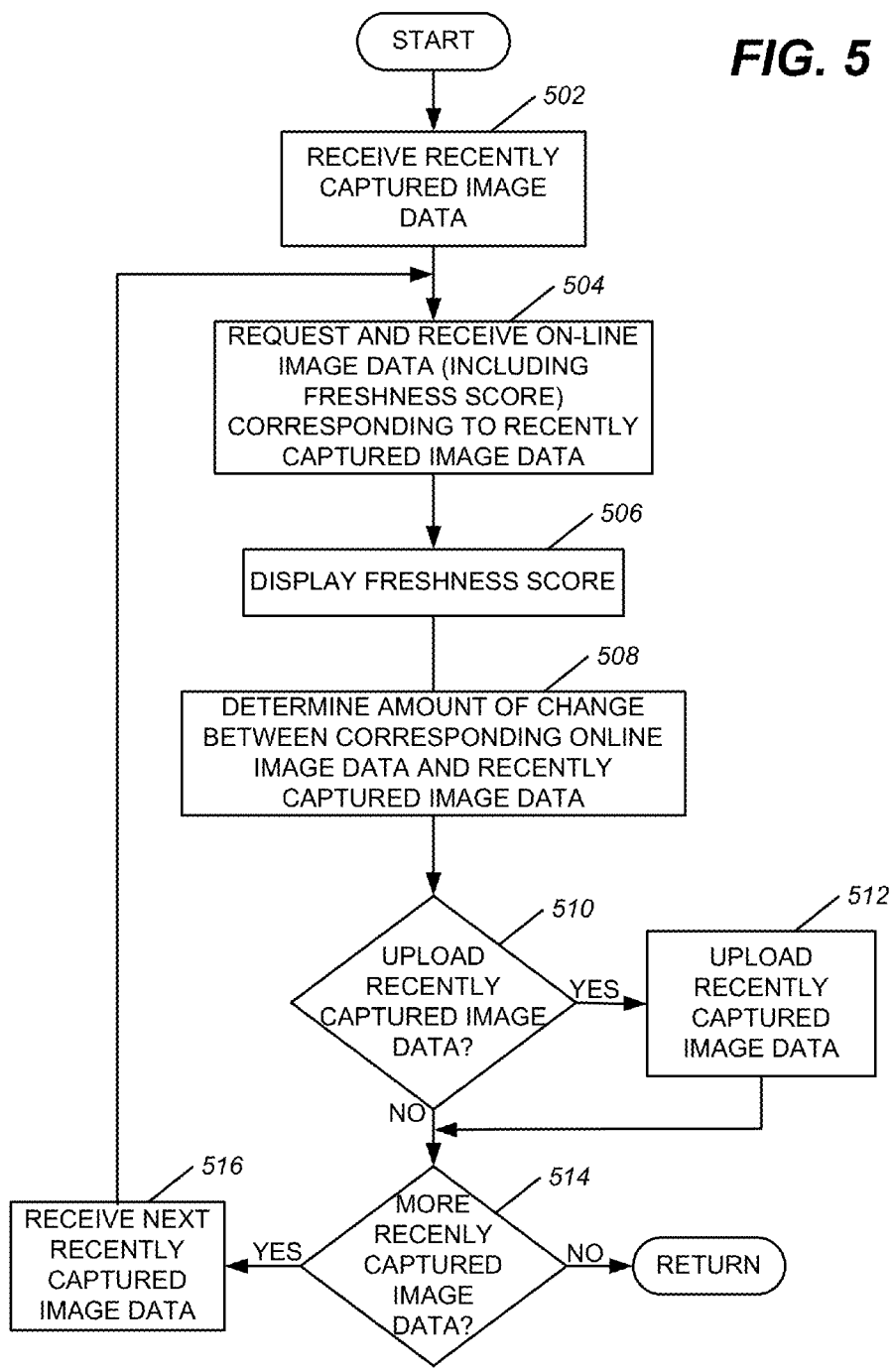
FIG. 5 is a flowchart of an exemplary process which may be implemented in a second embodiment.

FIG. 5 is a flowchart illustrating exemplary processing in an embodiment in which street-level images may be acquired. The process may begin with third computing device 108 obtaining a recently captured street-level image, or image data, from image capturing device 106, and location data from one or more location sensors (act 502). Third computing device 108, image capturing device 106 and the one or more location sensors may be located within a moving vehicle.

Third computing device 108 may request and receive a corresponding online image, or image data, and an associated freshness score from second processing device 106 (act 504). Third computing device 108 may present, or display, the associated freshness score (act 506). Third computing device 108 may then compare aspects of the corresponding online image, or image data, and the recently captured street-level image, or image data to determine an amount of change between the corresponding online image, or image data, and the recently captured street-level image, or image data (act 508). Various modalities may be employed by third computing device 108 to better sense a structure and a reflectance of the recently captured street-level image, or image data. The modalities may include, but not be limited to: color video; stereo video; Light Detection And Ranging (LIDAR), which is a measuring system that uses light from a laser to detect and locate objects based on a same principle used by radar; and near infrared (IR) input. Techniques including, but not limited to, face detection, pedestrian detection, vehicle detection, motion detection and detection of foreground objects may be employed to limit change detection to static buildings appearing in a street-level image rather than to cars and/or people. In some implementations, techniques may be employed including, but not limited to, text recovery from natural images on street signs and/or business signs for recovering text and comparing the recovered text to known data to detect changes.

Third computing device 108 may then determine whether to upload the recently captured street-level image, or image data, to second computing device 104 based on the determined amount of change and the freshness score (act 510). With respect to an older previously acquired and stored image, or image data, a minimum amount of change for a determination to upload the recently captured street-level image, or image data is smaller than a minimum amount of change, with respect to a younger previously acquired and stored street-level image, or image data, for the determination to upload the recently captured street-level image.

If, during act 510, third computing device 108 determines that the recently captured street-level image, or image data, is to be uploaded to second computing device 104, then third computing device 108 may upload the recently captured street-level image, or image data, to second computing device 104. Otherwise, third computing device 108 may discard the recently captured street-level image, or image data, and may determine whether there are any additional recently captured street-level images, or image data, to process (act 514). If no additional recently captured street-level images, or image data exists, then the process may be completed. Otherwise, third computing device 108 may receive, or obtain, a next recently captured image, or image data (act 516), and may repeat acts 504-516 until no additional recently captured street-level image, or image data exists.

In other embodiments, a multitude of online images, or image data, captured by users may be employed in a same manner as the recently captured images, or image data, in the above described embodiments in order to determine whether to update previously acquired and stored images, or image data. For example, approximately two million images from Flicker, an online photo sharing service, have been matched to a world model. Change detection may be used to guide processing of the approximately two million images, thereby focusing effort on only ones of the approximately 2 million images that include new information.

CONCLUSION

Various embodiments were described in which a recently captured low-resolution aerial image, or a street-level image, may be compared with a corresponding previously acquired and stored high-resolution image to determine an amount of change. The determined amount of change and a freshness score associated with the previously acquired and stored high-resolution image may be used to make a determination whether to order a high-resolution aerial image. Using change detection, only recently captured images, which include new information, may be used by one or more remote computing devices to update corresponding previously acquired and stored images.

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Other configurations of the described embodiments are part of the scope of this disclosure. For example, in other embodiments, an order of acts performed by a process may be different and/or may include additional or other acts.

Accordingly, the appended claims and their legal equivalents define embodiments, rather than any specific examples given.

We claim as our invention:

1. A method for guiding data capturing, comprising:
   obtaining, by a computing device, a freshness score of a previously stored high-resolution aerial image of a geographic area, the freshness score indicating a probability that a new high-resolution image is needed so as to update coverage of a geographic area;
   obtaining, by the computing device, a recent low-resolution aerial image of the geographic area;
   comparing, by the computing device, aspects of the recent low-resolution aerial image with aspects of the previously stored high-resolution aerial image to determine an amount of change; and
   determining, by the computing device, whether to order new high-resolution aerial images based on to freshness score and the determined amount of change.

2. The method of claim 1, wherein the freshness score is at least partially based on an age of the previously stored high-resolution aerial image, such that a smaller minimum amount of change with respect to an older high-resolution aerial image causes the determining to determine that a new high-resolution aerial image is to be obtained than a minimum amount of change with respect to a newer previously stored high-resolution aerial image.

3. The method of claim 1, wherein the recent low-resolution aerial image and the previously-obtained high-resolution aerial image were captured during a same season in different years in order to reduce an effect of seasonal differences, 4. The method of claim 3, wherein the current low-resolution aerial image and the previously stored high-resolution aerial image were captured by a same satellite.

5. The method of claim 1, wherein the amount of change is determined based on a change in at least one item from a group of items consisting of a color distribution in an area, a spectral reflectance in the area, and textures in the area.

6. The method of claim 1, wherein the comparing further comprises hallucinating a synthetic high-resolution image from the obtained recent low-resolution aerial image after the determining determines that a new high-resolution image is to be ordered.

7. The method of claim 1, wherein the amount of change is further determined based on non-image data.

8. A computing device comprising:
   an interface for connecting to an image capturing device;
   at least one processor;
   a storage device;
   a communication interface for communicating with at least one other computing device;
   a bus connecting the at least one processor with the interface, the storage device, and the communication interface; and
   a memory connected to the at least one processor via the bus, the memory including instructions for the at least one processor to perform a method comprising:
      receiving captured image data from the image capturing device via the interface,
      requesting and downloading, via the communication interface, online image data corresponding to the captured image data, the downloaded online image data including a freshness score that represents a probability that online image data should be updated,
      determining an amount of change between the received captured image data and the downloaded online image data,
      determining whether to upload the received captured image data to a remote computing device based, at least partially, on the determined amount of change, and
      uploading the received captured image data to the remote computing device only when the determining whether to upload the received captured image data determines that the received captured image data is to be uploaded.

9. The computing device of claim 8,
   wherein the determining whether to upload the received captured image data is further based on the freshness score, such that an amount of change with respect to older online image data is smaller than an amount of change with respect to newer online image data to cause a determination to upload the received captured image data.

10. The computing device of claim 9, wherein the method further comprises displaying of the freshness score.

11. The computing device of claim 8, wherein the determining an amount of change further comprises:
    using stereo video to estimate a size of an object, and
    removing the object from consideration when calculating the amount of change when the object is estimated to be a size of a person.

12. The computing device of claim 8, wherein the determining an amount of change further comprises:
    limiting the determining of the amount of change to static buildings included in a scene represented by the captured image data.

13. The computing device of claim 12, wherein the limiting the determining of the amount of change further comprises:
    using at least one technique from a group of techniques comprising face detection, pedestrian detection, vehicle detection, motion detection, and foreground object detection to eliminate an effect of some objects on the determined amount of change.

14. The computing device of claim 8, wherein the determining an amount of change further comprises:
recovering text from the captured image data, and
comparing the recovered text from the captured image data with known data.

15. A method for guiding capturing of image data, the method comprising:
comparing, by the at least one computing device, recently captured image data for a geographic area with previously stored image data for the geographic area in order to determine an amount of change;
determining, by the at least one computing device, whether the previously-stored image data is to be updated based on a freshness score of the previously stored image data and the determined amount of change;
hallucinating a synthetic high resolution image based on the low-resolution image data and the previously stored image data when the determining determines that the previously stored image data is to be updated; and
presenting the synthetic high resolution image to a user in response to receiving a request from the user.

16. The method of claim 15, wherein:
the recently captured image data is either low-resolution aerial image data or street level image data.

17. The method of claim 15, wherein
the recently captured image data is low-resolution image data.

18. The method of claim 17, further comprising:
replacing the synthetic high resolution image with a recent high-resolution image.

19. The method of claim 15, further comprising:
obtaining non-image data related to the previously-stored image data; and
determining whether the previously stored image data is to be updated based, at least partially, on the non-image data and a freshness score associated with the previously stored image data.

20. The method of claim 15, further comprising:
obtaining a plurality of user-provided online image data;
comparing the plurality of user-provided online image data with corresponding ones of the previously stored image data; and
using only ones of the plurality of user-provided online image data having new information with respect to the corresponding ones of the previously stored image data to update the corresponding ones of the previously stored image data.

* * * * *